United States Patent [19]

Ito

[11] 4,218,734
[45] Aug. 19, 1980

[54] PROCESS QUANTITY DISPLAY APPARATUS

[75] Inventor: Masayuki Ito, Fuchu, Japan

[73] Assignee: Tokyo Shibaura Denki Kabushiki Kaisha, Japan

[21] Appl. No.: 937,850

[22] Filed: Aug. 29, 1978

[30] Foreign Application Priority Data

Sep. 2, 1977 [JP] Japan .................................. 52/104782

[51] Int. Cl.² .............................................. G06F 15/46
[52] U.S. Cl. .................................... 364/118; 340/793;
364/119; 364/518
[58] Field of Search ............... 364/105, 106, 118, 119,
364/518, 521; 318/624, 626, 563, 565, 566;
324/99 D; 340/791, 793, 753

[56] References Cited
U.S. PATENT DOCUMENTS

| 3,604,907 | 9/1971 | Wesner | 318/624 X |
| 3,621,391 | 11/1971 | Miller | 324/99 D |
| 3,638,001 | 1/1972 | Gordon | 324/99 D X |
| 3,728,524 | 4/1973 | Gray | 324/99 D X |
| 3,736,486 | 5/1973 | Gould et al. | 318/624 |
| 3,961,234 | 6/1976 | Chambers et al. | 318/624 X |

*Primary Examiner*—Joseph F. Ruggiero
*Attorney, Agent, or Firm*—Stevens, Davis, Miller & Mosher

[57] ABSTRACT

Disclosed is a process quantity display apparatus of the type wherein a plurality of process quantities of a plant detected by a detector are displayed by a pictorial display device and the displayed process quantity is renewed under the control of a process quantity display renewal unit which includes a significant difference operator which produces a significant difference when a displayed process quantity is to be renewed, and a display renewal judging unit which renews the display of the display device when the variation of the detected process quantity exceeds the significant difference. Instead of or in addition to a pictorial display device, a control device may be provided to control the process quantity of the plant in response to the output of the display renewal judging unit.

8 Claims, 4 Drawing Figures

PROCESS QUANTITY DISPLAY APPARATUS

BACKGROUND OF THE INVENTION

This invention relates to apparatus for displaying various process quantities of a plant with a pictorial display device for monitoring the state of the plant.

Various types of apparatus have been used for monitoring the state of a plant, for example an electric power generating plant, and in some cases the state of the plant is monitored by pictorially displaying the process quantities. The pictorial display of analogue quantities is made with digital values or made in the form of a graph with analogue values. The digital values display is advantageous since the plant operator can recognize the displayed values at a glance. However, as the displayed values vary in response to a small variation of the values the operator pays more attention than needed to such variations. Furthermore, each time the value to be displayed varies, it is necessary to renew the pictorial display thereby increasing the burden on the display apparatus.

To prevent this difficulty, where it is necessary to renew the display of a process quantity, it has been the practice to compare a value now being displayed with a detected value of the process quantity so as to prevent renewal of the display so long as the difference is smaller than a definite value. Thus, the difference between the displayed value and the detected value is compared with a predetermined definite value and the display is not renewed as long as the resulting difference is less than a predetermined value. However, as the absolute value of the process quantity increases, even though the rate of change of the process quantity may be small, the difference between the displayed value and the detected value would become large and in some cases exceed the predetermined value. For this reason, even when the rate of change of the detected value with reference to the displayed value is small, when the absolute value of the process quantity increases the renewal of the display takes place frequently with the result that the burden of the process quantity display apparatus would not be decreased. For example, if the process quantity fluctuates between 399,995 and 400,005 for some reason and when said predetermined value is 10, due to a small variation the detected value would change around 400,000 so that all of the 6 digits change. In other words, the operator pays more attention than is actually needed thus failing to accurately monitor the plant.

Since the variation or fluctuation of the process quantity is inevitable, this problem should be solved when displaying digital values.

SUMMARY OF THE INVENTION

Accordingly, it is an object of this invention to provide an improved process quantity display apparatus capable of avoiding useless renewal of the display when the process quantity varies slightly thereby decreasing the burden on the plant operator, but which can effect fine display renewal when it is necessary to detect a small variation in the process quantity for the purpose of monitoring the plant.

Another object of this invention is to provide an improved control system of a plant which controls a process quantity of the plant only when the process quantity varies beyond a predetermined value.

According to one aspect of this invention, there is provided process quantity display apparatus of a plant comprising a detector for detecting a plurality of types of the process quantities of the plant, a process quantity collecting unit for collecting the process quantities detected by the detector, a pictorial display means for displaying the detected process quantities, and a process quantity display renewal unit responsive to a detected process quantity and to a process quantity now being displayed on the pictorial display means for judging whether display of the displayed process quantity should be renewed or not, wherein the process quantity display renewal unit includes a significant difference operator which in response to a degree of importance of the variation of a process quantity of the plant determines a significant difference which is used as a reference value for judging whether the display renewal is to be made or not, and a display renewal judging unit which produces a display renewal instruction when the variation of the process quantity exceeds the significant difference.

According to another aspect of this invention there is provided a control system of a plant comprising a detector for detecting a plurality of types of the process quantities of the plant, a process quantity collecting unit for collecting the process quantities detected by the detector, a control device for controlling the process quantities of the plant, and a process quantity control renewal unit responsive to a detected process quantity and to a process quantity now being controlled by the control device for judging whether control of the process quantity should be renewed or not, said process quantity control renewal unit comprising a significant difference operator which in response to a degree of importance of the variation of a process quantity of the plant determines a significant difference which is used as a reference value for judging whether control renewal is to be made or not, and a control renewal judging unit which produces a control instruction when the variation of the process quantity exceeds the significant difference.

DESCRIPTION OF THE PREFERRED EMBODIMENTS

Figure 1:
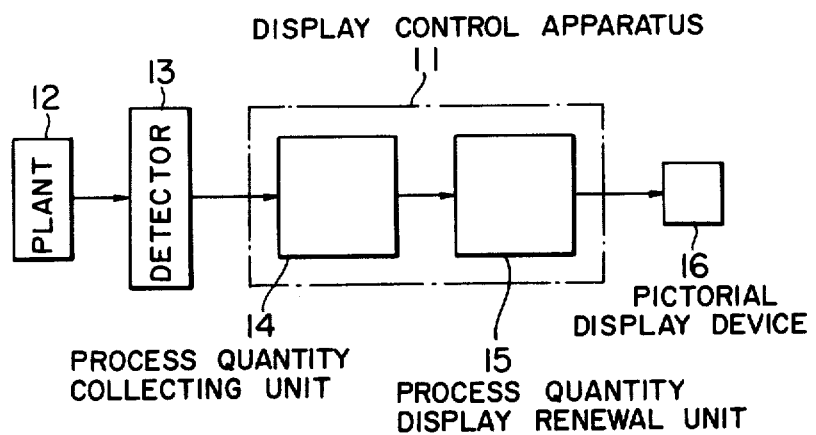
FIG. 1 is a block diagram showing one embodiment of the process quantity display apparatus of this invention as applied to a plant.

FIG. 1 shows an application of process quantity display apparatus 11 embodying the invention to an electric power generating plant 12, for example. A process quantity of the plant 12 is applied to the display control apparatus 11 through a detector 13. The process quantity display control apparatus 11 comprises a process quantity collecting unit 14 and a process quantity display renewal unit 15. After performing a predetermined arithmetic operation it sends a display signal to a pictorial display device 16.

Usually, since a plurality of types of the process quantities of the plant are detected, they are collected by the process quantity collecting unit 14 which converts received analogue quantities into digital quantities corresponding to respective process quantities. A plurality of digital signals thus produced are applied to the process quantity display renewal unit 15 to determine whether the displayed values of respective process quantities should be renewed or not.

Figure 3:
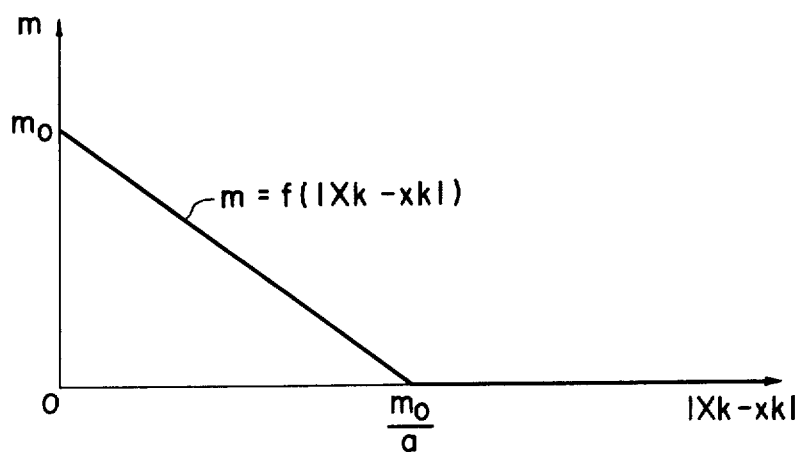
FIG. 3 is a graph showing the characteristic curve of a correction digit number arithmetic operation unit.
Figure 2:
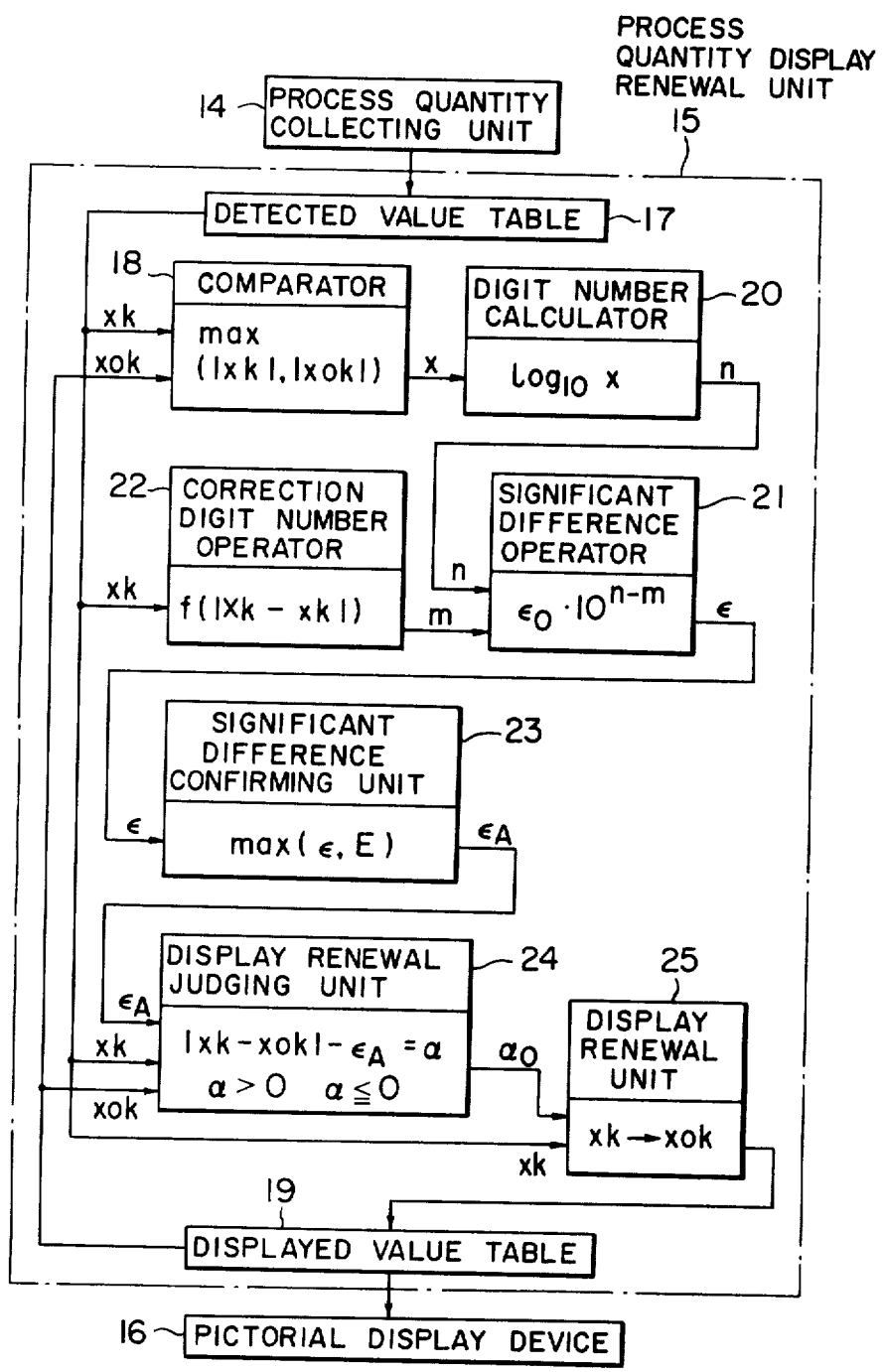
FIG. 2 is a block diagram showing one example of the display renewal unit.

FIG. 2 shows the detail of one example of the process quantity display renewal unit 15. The digital quantities obtained by the analogue-digital converting action of the process quantity collecting unit 14 are stored in a detected value table or memory device 17. The detected value xk stored in this table is applied to a comparator unit 18 together with a corresponding displayed value $x_0k$ which is supplied from a displayed value table or memory device 19. The comparator unit 18 compares the absolute values of the detected value xk and of the displayed value $x_0k$ and produces the larger one of the two as an output. In the comparator unit an arithmetic operation $x = \max(|xk|, |x_0k|)$ is executed, and the result x is applied to a digit number calculator 20 which determines the number of digits n from a common logarithm of the result of the comparison, i.e. x. Since the result of comparison comprises the absolute value of larger one of the absolute value $|xk|$ of the detected value xk and the absolute value $|x_0k|$ of the displayed value $x_0K$ it is always positive. Generally, x is shown by $x = x_0 \times 10^n$ where n is an integer, and $0 < x_0 < 10$. In this case, the common logarithm of the result of comparison is shown by $\log 10x = \log 10 \cdot x_0 + n$ and n is taken out as a digit number n. The digit number n thus obtained is applied to a significant difference operator 21 which is also supplied with a correction digit number m (an integer) from a correction digit number operator 22. The correction digit number operator 22 is supplied with the detected value xk from the detected value table 17 for calculating a function $f(|Xk - xk|)$ where Xk represents a preset alarm value and $|Xk - xk|$ the absolute value of the difference between Xk and xk to obtain the correction digit number m applied to the significant difference operator 21. Function $m = f(|Xk - xk|)$ is selected such that it decreases monotonously in a range in which $m \leq 0$, one example of this characteristic being shown in FIG. 3. The function $m = f(|Xk - xk|)$ is a function expressed by $f(|Xk - xk|) = \max\{0, -a \cdot |Xk - xk| + m_0\}$ where a and $m_0$ are positive integers. As can be noted from FIG. 3, when the detected value xk approaches the alarm set value the correction digit number m increases, whereas as the detected value xk departs from the alarm set value Xk, the correction digit number m decreases. In a range of $|Xk - xk| \geq m_0/a$ the correction digit number is always zero. The correction digit number m having the aforementioned characteristic, and the digit number n are applied to the significant difference operator 21.

The significant difference operator 21 arithmetically uses the digit number n and the correction digit number m to obtain a significant difference $\epsilon$. By the term "significant difference $\epsilon$" is meant a value which is used as a reference for judging whether the variation in the process quantity is necessary to be monitored or not, and this significant difference can be obtained from an operational equation $\epsilon = \epsilon_0 10^{n-m}$, where $\epsilon_0$ is a positive constant. Thus, when the detected value xk of the process quantity approaches the alarm set value Xk, the correction digit number m increases and hence the significant difference $\epsilon$ decreases.

The significant difference $\epsilon$ thus obtained is applied to a significant difference confirming unit 23. As above described, as the detected value xk of the process quantity approaches the alarm set value Xk, the significant difference $\epsilon$ decreases. However, if this difference $\epsilon$ were too small it would be impossible to effect proper renewal of the display. For this reason, a minimum value of the significant difference $\epsilon$ necessary for the proper display renewal is set in the significant difference confirming unit 23 as a significant difference lower limit value E so as to produce it as the correction significant difference $\epsilon A$ when the significant difference $\epsilon$ is less than the significant difference lower limit value E. In this manner, the significant difference comfirming unit 23 performs a mathematic operation of $\epsilon A = \max(\epsilon, E)$.

The correction significant difference $\epsilon A$ thus determined is applied to a display renewal judging unit 24 to be used as a reference value of display renewal. More particularly, the display renewal judging unit 24 judges that whether the absolute value of the difference between the detected value xk of the process quantity and the displayed value $x_0k$, that is $|xk - x_0k|$ is larger than the correction significant difference $\epsilon A$ or not. Such judgement is made according to an operational equation of $|xk - x_0k| - \epsilon A = \alpha$ and when the result of judgment $\alpha$ is larger than zero the judging unit 24 applies a display renewal instruction $\alpha_0$ to a display renewal unit 25.

In response to the display renewal instruction $\alpha_0$ the display renewal unit 25 changes the detected value xk to the display value $x_0k$ which is stored in the display value table 19. On the other hand, when the result of judgment $\alpha$ is $\alpha \leq 0$, no display renewal instruction $\alpha_0$ is produced and no display renewal is made.

In this manner, it is judged that whether the display of the detected value xk of the process quantity should be renewed or not. After a series of operations, the detected value $xk + 1$ of the next process quantity is derived out of the detected value table 17 and applied to the comparator 18 to be judged as above described. Among sequentially judged process quantities only those which are judged that their displays should be renewed are displayed on the pictorial display device.

As above described, according to this invention, even when a number of process quantities are being displayed on the pictorial display device, since it is possible to select an appropriate significant difference as a reference value for judging renewal of the display it is possible to renew only limited number of displays which actually require renewal without increasing the burden on the process quantity display apparatus. Moreover, by the operation of the correction digit number operator, when the detected value of the process quantity approaches the alarm set value, the significant difference is automatically decreased so that where it is necessary to detect minute changes of the process quantity for the purpose of monitoring a plant it is possible to finely renew the display. In other words, according to this invention it is possible to prevent undesired display renewal, but to effect fine renewal when desired.

In some cases, the output of the display control apparatus 11 may be used to control a process quantity of a plant. Where the process quantity inherently contains noise or where the detector introduces noise into the detected process quantity, the control signal supplied to the plant would contain noise thus effecting erroneous control.

Figure 4:
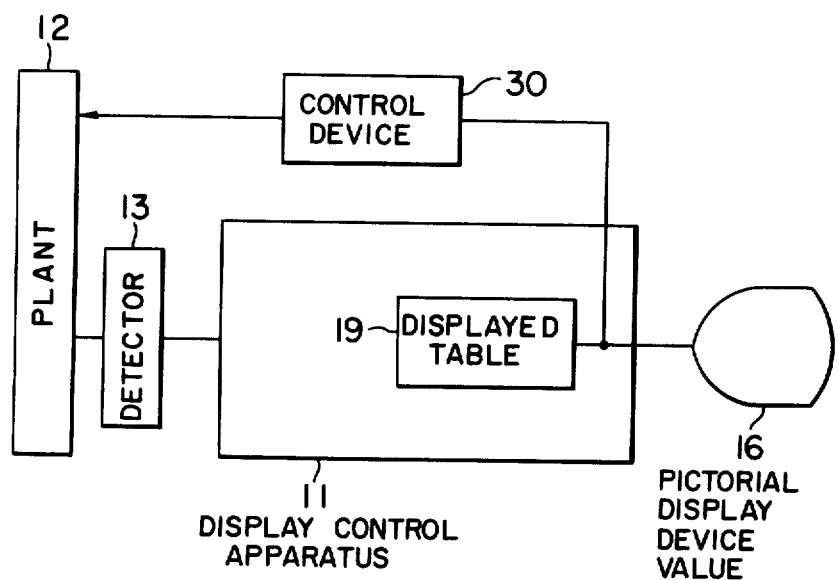
FIG. 4 is a block diagram showing a system of controlling a plant by using the display apparatus shown in FIG. 2.

FIG. 4 shows an application of the display control apparatus shown in FIG. 1 to the control of a process quantity of the plant. Thus, a portion of the output of the displayed value table 19 is applied to the plant through a control device 30 to control the displayed process quantity. By using the process quantity contained in the displayed value table as the input to the control device it is possible to accurately control the process quantity without being affected by the noise described above. Thus, the process quantity utilized for the control has a value which is determined by judging the fact that whether the newly detected process quantity has varied beyond the significant difference or not so that it contains substantially no noise and the output of the control device is correctly proportional to the variation in the detected process quantity.

Where the output of the process quantity display renewal unit is applied to only the control device 30 shown in FIG. 4 without operating the pictorial display unit, the term "display" shown in FIG. 2 and utilized in the description thereof should be read as "control". Thus, for example terms "process quantity display renewal unit", "display renewal judging unit", "display renewal unit", and "displayed value table" should be read as "process quantity control renewal unit", "control renewal judging unit", "control renewal unit" and "controlled value table" respectively.

I claim:

1. In process quantity display apparatus of a plant, comprising a detector for detecting a plurality of process quantities of said plant, a process quantity collecting unit for collecting the process quantities detected by said detector, a pictorial display means for displaying said detected process quantities, and a process quantity display renewal unit responsive to a detected process quantity and to a process quantity being displayed by said pictorial display means for judging whether display of said displayed process quantity should be renewed or not, the improvement wherein said process quantity display renewal unit comprises a significant difference operator for providing a significant difference value which varies as a function of the difference between said detected process quantity and a preset alarm limit, and a display renewal judging unit which produces a display renewal instruction when the variation in said detected process quantity exceeds said significant difference value.

2. The process quantity display apparatus according to claim 1 wherein said process quantity collecting unit includes means for converting analogue quantities detected by said detector into digital quantities.

3. The process quantity display apparatus according to claim 1 wherein said process quantity display renewal unit comprises a comparator which compares the absolute value of a detected process quantity supplied from said process quantity collecting unit with the absolute value of a process quantity being displayed by said pictorial display means to produce a larger one of the compared quantities, a digit number calculator responsive to the output of said comparator for determining the number of digits n, where n is an integer, which are applied to said significant difference operator, a correction digit number operator which determines a correction digit number m, where m is an integer, relating to the absolute value of the difference between a detected process quantity supplied from said process quantity collecting unit and a preset alarm value for supplying said correction digit number m to said significant difference operator, and a significant difference confirming unit responsive to the output of said significant difference operator to produce a correction significant difference value when said significant difference value is smaller than a predetermined lower limit, said correction significant difference value being applied to said display renewal judging unit together with said detected process quantity and said process quantity being displayed, whereby said display renewal judging unit produces a display renewal instruction when the absolute value of the difference between said detected process quantity and said process quantity being displayed is larger than said correction significant difference value, said display renewal unit changing the process quantity displayed by said pictorial display means in response to the output of said display renewal judging unit.

4. The process quantity display apparatus according to claim 3 wherein said process quantity display renewal unit further comprises a detected value table for receiving and storing the output of said process quantity collection unit, the output of said detected value table being connected to said comparator, said correction digit number operator, and said display renewal judging unit; and a displayed value table connected between said display renewal unit and said pictorial display means.

5. The process quantity display apparatus according to claim 1 which further comprises a control device responsive to the output of said process quantity display renewal unit for controlling the process quantities of said plant.

6. The process quantity display apparatus according to claim 4 which further comprises a control device responsive to the output of said displayed value table for controlling the process quantities of said plant.

7. A control system of a plant comprising a detector for detecting a plurality of process quantities of said plant, a process quantity collecting unit for collecting the process quantities detected by said detector, a control device for controlling the process quantities of said plant in accordance with a control value, and a process quantity control renewal unit responsive to a detected process quantity and to a process quantity control value currently used by said control device for judging whether said process quantity control value should be renewed or not, said process quantity control renewal unit comprising a significant difference operator for providing a significant difference value which varies as a function of the difference between said detected process quantity and a preset alarm limit, and a control renewal judging unit which produces a control instruction when the variation in said detected process quantity exceeds said significant difference value.

8. The control system according to claim 7 wherein said process quantity control renewal unit comprises a comparator which compares the absolute value of a detected process quantity supplied from said process quantity collecting unit with the absolute value of a process quantity control value currently used by said control device to produce a larger one of the compared quantities as an output, a digit number calculator responsive to the output of said comparator for determining the number of digits n, where n is an integer, which are applied to said significant difference operator, a correction number digit operator which determines a correction digit number m, where m is an integer, relating to the absolute value of the difference between a detected process quantity supplied from said process quantity collecting unit and a preset alarm value for supply said correction digit number m to said significant difference operator, and a significant difference confirming unit responsive to the output of said significant difference operator to produce a correction significant difference value when said significant difference value is smaller than a predetermined lower limit, said correction significant difference value being applied to said control renewal judging unit together with said detected quantity and said process quantity control value currently used, said control renewal judging unit producing a control renewal instruction when the absolute value of the difference between said detected process quantity and said process quantity control value currently used by said control device is larger than said correction significant difference value, said control renewal unit changing the process quantity control value used by said control device in response to the output of said control renewal judging unit.

* * * * *